M. TURLEY.
Wheel Plow.
No. 19,388.
Patented Feb. 16, 1858.
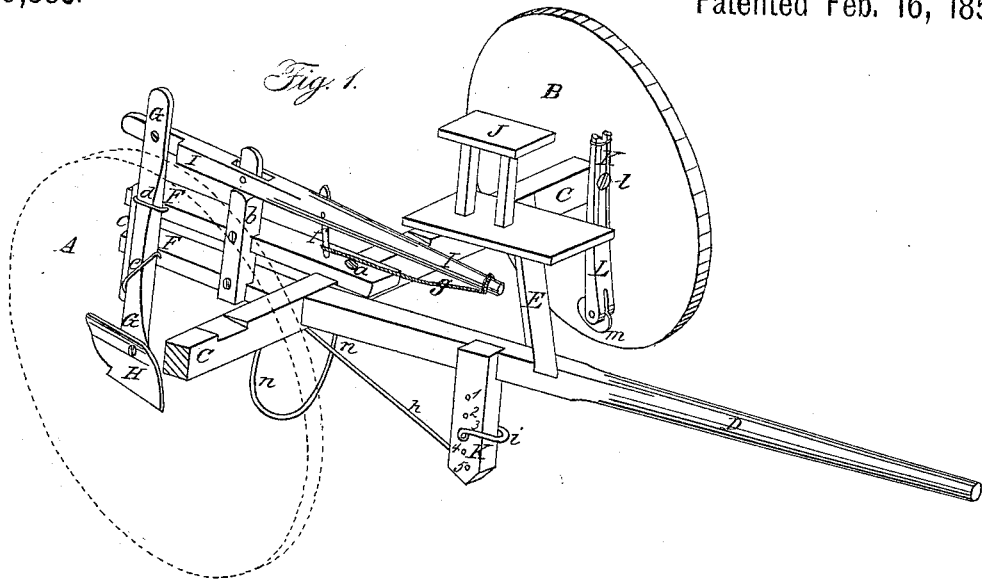
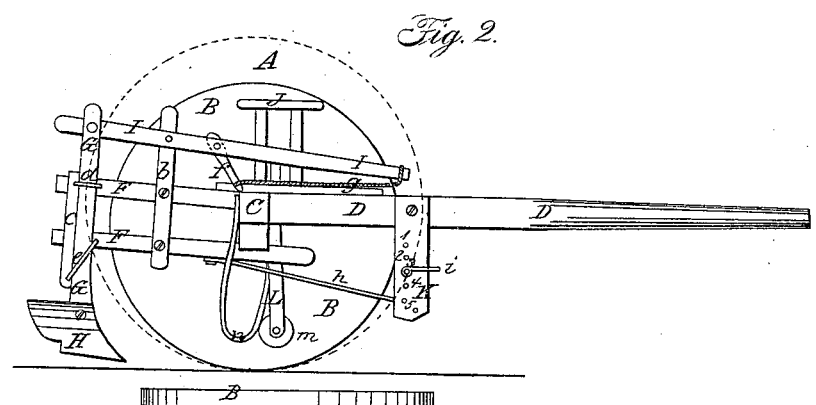
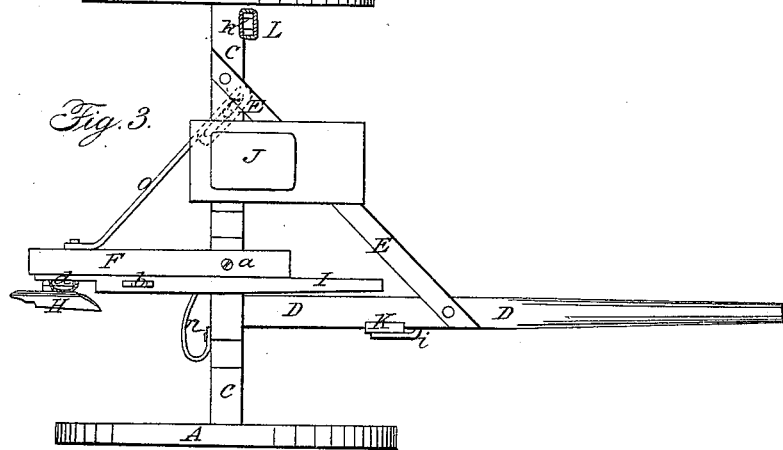

UNITED STATES PATENT OFFICE.

MARSHALL TURLEY, OF GALESBURG, ILLINOIS.

IMPROVEMENT IN PLOWS.

Specification forming part of Letters Patent No. 19,388, dated February 16, 1858.

*To all whom it may concern:*

Be it known that I, MARSHALL TURLEY, of Galesburg, in the county of Knox and State of Illinois, have invented certain new and useful Improvements in Plows; and I do hereby declare the following to be a full, clear, and exact description of the construction and operation of the same, reference being had to the accompanying drawings, in which—

Figure 1 represents a perspective view of the plow, with the wheel in front of the figure in red lines to better show the parts behind it. Fig. 2 represents a vertical section, and Fig. 3 represents a top plan.

Similar letters of reference, where they occur in the several figures, denote like parts of the plow in all of them.

My invention relates to the devices which I employ for cutting the stalks, weeds, &c., for gathering them in rows, so as to be covered by the furrow-slice, and for the adjustment of the plow in making a wider or narrower furrow.

To enable others skilled in the art to make and use my invention, I will proceed to describe the same with reference to the drawings.

A represents a larger, and B a smaller, supporting-wheel, both arranged on an axle, $c$, so that the former can run in the furrow previously turned and the latter on the land, so as to keep the plow as nearly level as possible.

D is the tongue by which the plow is guided. It is placed in or near the line of resistance of the plow, which may be to one side of the center of the axle C. A brace, E, extends from the tongue to the axle of the plow to cause the plow to more certainly follow the tongue.

From above and below the axle C extend rearward two beams, F F, which are pivoted or bolted to the axle at $a$ (one pivot or bolt serving for both) and braced behind the axle to give them the proper rigidity by the braces $b\ c$. The brace $c$ projects below the lower beam, and has in it loops, braces, staples, or guides $d\ e$, through which pass a shank or stock, G, that has the plow H fastened to its lower end. The brace $b$ extends up above the upper beam, F, and forms a fulcra for the lever I, to which lever the upper end of the shank or stock G is pivoted, so that said stock, with the plow, can be raised or lowered by said lever at any time by the conductor, who rides on the plow.

A brace, $f$, is pivoted to the lever I, which, when set as shown in Fig. 2, will prevent the plow from rising; but the operator, by simply pulling the cord $g$, throws out the brace, and the plow can then rise vertically. One, two, or three of these plows may be used on the same axle; or, if one only is used, it may be shifted on the axle to such point as will best equalize the draft and balance the plow. The conductor's seat J is placed on the opposite end of the axle, or opposite half of the axle, from where the plow or plows are arranged, so as to balance the plow and prevent side draft.

A piece, K, attached to the tongue D, projects below said tongue, and a drag-rod, $h$, extends from said piece K to the lower beam, F, behind the axle C. The draft-bar or clevis $i$, by which the plow is drawn, is also fastened in one of the holes 1 3 3 4 5 in said piece K to raise or lower the point of the plow, as may be desired.

On the axle C, and near to the wheel B, is placed a downwardly-projecting piece, L, which has a slot, $k$, in its upper end, by which and by a set-screw, $l$, it is made adjustable on said axle. The lower end of this piece L carries a stalk-cutter, $m$, which, being smaller, will of course rotate faster on its axis than the wheel B, alongside of which it is placed. The effect of this is that while the wheel B is upon and holds the stalks the cutter $m$ severs them, and they are more readily turned under the furrow.

To the axle C, in front of the line of the plow or plows, is fastened what I term a "weed-gatherer," $n$. It may be made of round rods or stout wire, one end being fastened to the front of the axle and bowing downward and backward and then upward. Its other end is fastened to the rear of the axle. This gatherer catches the weeds and stalks and moves them into the line of the furrow that is being turned, and the furrow-slice drops over upon them, covering them entirely up. This gatherer is made adjustable, so as to be raised or lowered, as may be required.

From the rear of the beams F a rod, $o$, extends, having a slot, $r$, in it, through which slot a set-screw or bolt passes to hold that end of said rod to the axle C, as shown in Fig. 3. The object of this rod $o$ is to draw and hold the plow, with its several attachments, nearer to or farther from the line of the furrow for making said furrow wider or narrower, as may be preferred, or for throwing the point of the plow more into or out of the land.

Having thus fully described the nature and object of my invention, what I claim therein as new, and desire to secure by Letters Patent, is—

1. The combination of the beams, plow-shank, lever, and brace, or adjusting-rod, arranged behind the axle, substantially as herein set forth.

2. The combination of the wheel B for holding, with the cutter $m$ for cutting, the stalks, substantially as described.

3. The combination of the weed-gatherer $n$ with the plow or plows, when arranged and operating as herein set forth.

MARSHALL TURLEY.

Witnesses:
J. C. H. HURLBUT,
L. M. RUGAR.